K. R. SMITH.
ACID PROOF ELECTRIC BATTERY TERMINAL.
APPLICATION FILED FEB. 15, 1907.
1,006,697.
Patented Oct. 24, 1911.
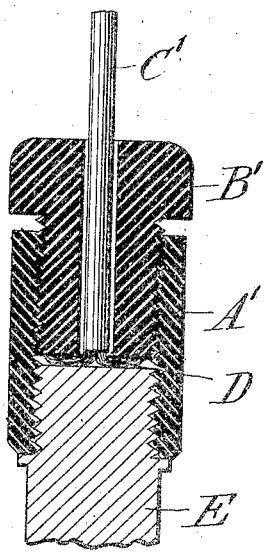

UNITED STATES PATENT OFFICE.

KENNETH RAWLINGS SMITH, OF TOTNES, ENGLAND.

ACID-PROOF ELECTRIC-BATTERY TERMINAL.

1,006,697.   Specification of Letters Patent.   Patented Oct. 24, 1911.

Application filed February 15, 1907. Serial No. 357,581.

*To all whom it may concern:*

Be it known that I, KENNETH RAWLINGS SMITH, a subject of the King of Great Britain, residing at Rosabelle, Totnes, South Devon, England, have invented certain new and useful Improvements in Acid-Proof Electric-Battery Terminals, of which the following is a specification.

This invention has for its object the provision of a terminal for accumulators, batteries and other electrical apparatus in which the metallic points of contact are maintained free from corrosion, thus insuring good electrical conduction and at the same time providing a junction which is easily separable and not liable to become adherent by corrosion. For this purpose a metallic cup is provided and permanently attached to the accumulator or battery and into it a non-metallic screw stopper (*e. g.* of ebonite) is fitted and serves to hold the end of the conductor in contact with the metal cup.

The drawing shows a vertical section of a terminal embodying my invention.

The stopper may be of ebonite, vulcanized fibers, celluloid, porcelain, the composition used for the screw stoppers of bottles, or other suitable material, and may advantageously be colored to distinguish between the positive and negative terminals.

The method of attaching the conductor may be modified; if it consists of a single wire the end may be simply bent after being passed through the aperture in the stopper, or formed into a loop so as to be firmly pressed against the floor of the cup.

In use the screw stopper generally remains attached to the conductor when batteries are changed and is transferred from one battery to another thus facilitating the process of changing.

It will be noted that the cup-shaped member instead of being an integral construction, is made in two parts comprising the internally-threaded sleeve portion into which the stopper B' screws, and the portion E which constitutes the floor of the cup.

I am aware that it has been proposed to make electrical connections with both screw-threaded recess and screw-threaded plug composed of metal, and I make no claim to this form generally.

Having fully described my invention, what I claim and desire to secure by Letters Patent is:—

A terminal for batteries and accumulators consisting of a leaden post externally threaded at its upper end, an internally threaded celluloid tube secured to the leaden post with its upper end projecting above the top of the leaden post, and a celluloid screwed plug fitting the interior of the celluloid tube and carrying the conducting wire axially therein, substantially as described and for the purposes stated.

In testimony whereof I have hereunto set my hand in presence of two subscribing witnesses this 1st day of February, 1907.

KENNETH RAWLINGS SMITH.

Witnesses:
 GEORGE T. KELLOCK,
 CHAS. H. WIDGER.